United States Patent
Katis et al.

(10) Patent No.: US 8,270,950 B2
(45) Date of Patent: Sep. 18, 2012

(54) MOBILE COMMUNICATION DEVICE, METHOD, AND SYSTEM FOR REDUCING EXPOSURE TO RADIO FREQUENCY ENERGY DURING TRANSMISSIONS BY TRANSMITTING MEDIA IN/OUT WHILE THE MOBILE COMMUNICATION DEVICE IS SAFE DISTANCE AWAY FROM USER

(75) Inventors: Thomas E. Katis, Jackson, WY (US); James T. Panttaja, Healdsburg, CA (US); Mary G. Panttaja, Healdsburg, CA (US); Matthew J. Ranney, Oakland, CA (US)

(73) Assignee: Voxer IP LLC, San Francisco, CA (US)

( * ) Notice: Subject to any disclaimer, the term of this patent is extended or adjusted under 35 U.S.C. 154(b) by 583 days.

(21) Appl. No.: 12/606,999

(22) Filed: Oct. 27, 2009

(65) Prior Publication Data

US 2010/0144321 A1   Jun. 10, 2010

Related U.S. Application Data

(60) Provisional application No. 61/120,288, filed on Dec. 5, 2008.

(51) Int. Cl.
*H04M 1/725* (2006.01)
(52) U.S. Cl. ............... 455/412.2; 455/456.3; 455/414.2; 455/522; 455/550.1; 455/456.4
(58) Field of Classification Search .... 455/412.1–412.2, 455/414.1–414.2, 422.1, 456.3, 456.4, 550.1, 455/522, 458, 69, 556.2
See application file for complete search history.

(56) References Cited

U.S. PATENT DOCUMENTS

| 4,807,224 A | 2/1989 | Naron et al. |
| 5,117,422 A | 5/1992 | Hauptschein et al. |

(Continued)

FOREIGN PATENT DOCUMENTS

WO   WO 03/073642   9/2003

(Continued)

OTHER PUBLICATIONS

"dircproxy," http://home.pcisys.net/~tbc/hacks/dircproxy.htm, Downloaded on Sep. 26, 2008, 1 page.

(Continued)

*Primary Examiner* — Jean Gelin
*Assistant Examiner* — Babar Sarwar
(74) *Attorney, Agent, or Firm* — Beyer Law Group LLP

(57) ABSTRACT

A mobile communication device and method for reducing exposure to radio frequency (RF) energy during outgoing and incoming transmissions. During outgoing transmissions, media is stored in a local storage element on the mobile communication device as the media is being created. When the device is positioned a safe distance away from the user, the media is transmitted out of storage over the network to the recipient. Alternatively for incoming transmissions, media is stored on the network as it is created. While the wireless communication device is a safe distance away from the user, the media stored on the network is transmitted to the mobile communication device, where it is locally stored. The user of the mobile communication device can then review the incoming media at an arbitrary later time out of storage. As a result, the exposure of the user of the mobile communication device to RF energy for both outgoing and incoming transmissions is either substantially reduced or eliminated altogether.

21 Claims, 6 Drawing Sheets

U.S. PATENT DOCUMENTS

| | | | |
|---|---|---|---|
| 5,283,818 | A | 2/1994 | Klausner et al. |
| 5,375,018 | A | 12/1994 | Klausner et al. |
| 5,390,236 | A | 2/1995 | Klausner et al. |
| 5,487,167 | A | 1/1996 | Dinallo et al. |
| 5,524,140 | A | 6/1996 | Klausner et al. |
| 5,541,690 | A * | 7/1996 | Petruchik ............... 396/335 |
| 5,572,576 | A | 11/1996 | Klausner et al. |
| 5,692,213 | A | 11/1997 | Goldberg et al. |
| 5,734,963 | A | 3/1998 | Fitzgerald et al. |
| 5,737,011 | A | 4/1998 | Lukacs |
| 5,918,158 | A | 6/1999 | LaPorta et al. |
| 5,963,551 | A | 10/1999 | Minko |
| 5,970,122 | A | 10/1999 | LaPorta et al. |
| 6,037,932 | A | 3/2000 | Feinleib |
| 6,092,120 | A | 7/2000 | Swaminathan et al. |
| 6,104,757 | A | 8/2000 | Rhee |
| 6,175,619 | B1 | 1/2001 | DeSimone |
| 6,195,562 | B1 * | 2/2001 | Pirhonen et al. ............ 455/553.1 |
| 6,233,389 | B1 | 5/2001 | Barton et al. |
| 6,262,994 | B1 | 7/2001 | Dirschedl et al. |
| 6,378,035 | B1 | 4/2002 | Parry et al. |
| 6,456,856 | B1 * | 9/2002 | Werling et al. ............ 455/575.5 |
| 6,480,783 | B1 | 11/2002 | Myr |
| 6,507,586 | B1 | 1/2003 | Satran et al. |
| 6,564,261 | B1 | 5/2003 | Gudjonsson et al. |
| 6,577,599 | B1 | 6/2003 | Gupta et al. |
| 6,580,694 | B1 | 6/2003 | Baker |
| 6,628,784 | B1 * | 9/2003 | Montane Condemines ............ 379/433.01 |
| 6,671,732 | B1 | 12/2003 | Weiner |
| 6,717,925 | B1 | 4/2004 | Leppisaari et al. |
| 6,721,703 | B2 | 4/2004 | Jackson et al. |
| 6,791,949 | B1 | 9/2004 | Ryu et al. |
| 6,807,565 | B1 | 10/2004 | Dodrill et al. |
| 6,807,578 | B2 | 10/2004 | Satran et al. |
| 6,829,473 | B2 | 12/2004 | Raman et al. |
| 6,834,039 | B1 | 12/2004 | Kelly et al. |
| 6,850,965 | B2 | 2/2005 | Allen |
| 6,912,544 | B1 | 6/2005 | Weiner |
| 6,931,114 | B1 | 8/2005 | Martin |
| 6,970,926 | B1 | 11/2005 | Needham et al. |
| 6,973,309 | B1 | 12/2005 | Rygula et al. |
| 6,993,009 | B2 | 1/2006 | Kelly et al. |
| 6,996,624 | B1 | 2/2006 | LeCroy et al. |
| 7,002,913 | B2 | 2/2006 | Huang et al. |
| 7,031,657 | B2 * | 4/2006 | Tehrani ................. 455/11.1 |
| 7,039,040 | B1 | 5/2006 | Burg |
| 7,039,675 | B1 | 5/2006 | Kato |
| 7,047,030 | B2 | 5/2006 | Forsyth |
| 7,111,044 | B2 | 9/2006 | Lee |
| 7,117,521 | B2 | 10/2006 | Puthiyedath |
| 7,139,371 | B2 | 11/2006 | McElvaney |
| 7,146,139 | B2 * | 12/2006 | Nevermann ................ 455/115.1 |
| 7,171,491 | B1 | 1/2007 | O'Toole et al. |
| 7,187,941 | B2 | 3/2007 | Siegel |
| 7,218,709 | B2 | 5/2007 | Garg et al. |
| 7,233,589 | B2 | 6/2007 | Tanigawa et al. |
| 7,236,738 | B2 | 6/2007 | Settle |
| 7,240,105 | B2 | 7/2007 | Satran et al. |
| 7,304,951 | B2 | 12/2007 | Rhee |
| 7,305,438 | B2 | 12/2007 | Christensen et al. |
| 7,313,593 | B1 | 12/2007 | Pulito et al. |
| 7,349,871 | B2 | 3/2008 | Labrou et al. |
| 7,382,881 | B2 | 6/2008 | Uusitalo et al. |
| 7,403,775 | B2 | 7/2008 | Patel et al. |
| 7,626,951 | B2 | 12/2009 | Croy et al. |
| 7,634,290 | B2 * | 12/2009 | Kelton et al. ................. 455/522 |
| 7,725,089 | B2 * | 5/2010 | Lee et al. ................... 455/188.1 |
| 8,023,984 | B2 * | 9/2011 | Jin et al. ......................... 455/522 |
| 2001/0025377 | A1 | 9/2001 | Hinderks |
| 2002/0128029 | A1 | 9/2002 | Nishikawa et al. |
| 2002/0150094 | A1 | 10/2002 | Cheng et al. |
| 2002/0154745 | A1 | 10/2002 | Shtivelman |
| 2002/0159600 | A1 | 10/2002 | Weiner |
| 2002/0184368 | A1 | 12/2002 | Wang |
| 2003/0027566 | A1 | 2/2003 | Weiner |
| 2003/0028632 | A1 | 2/2003 | Davis |
| 2003/0099198 | A1 | 5/2003 | Kiremidjian et al. |
| 2003/0126162 | A1 | 7/2003 | Yohe et al. |
| 2003/0186722 | A1 | 10/2003 | Weiner |
| 2004/0017905 | A1 | 1/2004 | Warrier et al. |
| 2004/0019539 | A1 | 1/2004 | Raman et al. |
| 2004/0074448 | A1 | 4/2004 | Bunt |
| 2004/0090959 | A1 | 5/2004 | Cinghita et al. |
| 2004/0095900 | A1 | 5/2004 | Siegel |
| 2004/0117722 | A1 | 6/2004 | Harada |
| 2004/0192353 | A1 | 9/2004 | Mason et al. |
| 2004/0192378 | A1 | 9/2004 | Wulkan |
| 2004/0252679 | A1 | 12/2004 | Williams et al. |
| 2004/0255148 | A1 | 12/2004 | Monteiro et al. |
| 2004/0258220 | A1 | 12/2004 | Levine et al. |
| 2005/0021819 | A1 | 1/2005 | Kilkki |
| 2005/0025308 | A1 | 2/2005 | Tischer et al. |
| 2005/0030932 | A1 | 2/2005 | Kelly et al. |
| 2005/0037706 | A1 | 2/2005 | Settle |
| 2005/0053033 | A1 | 3/2005 | Kelly et al. |
| 2005/0102358 | A1 | 5/2005 | Gold et al. |
| 2005/0135333 | A1 | 6/2005 | Rojas |
| 2005/0144247 | A1 | 6/2005 | Christensen et al. |
| 2005/0160345 | A1 | 7/2005 | Walsh et al. |
| 2005/0202807 | A1 | 9/2005 | Ayyasamy |
| 2005/0207487 | A1 | 9/2005 | Monroe |
| 2005/0215228 | A1 | 9/2005 | Fostick et al. |
| 2005/0220137 | A1 | 10/2005 | Prigent et al. |
| 2005/0259682 | A1 | 11/2005 | Yosef et al. |
| 2005/0288101 | A1 | 12/2005 | Lockton et al. |
| 2006/0007943 | A1 | 1/2006 | Fellman |
| 2006/0045038 | A1 | 3/2006 | Kay et al. |
| 2006/0059267 | A1 | 3/2006 | Cugi et al. |
| 2006/0059342 | A1 | 3/2006 | Medvinsky et al. |
| 2006/0093304 | A1 | 5/2006 | Battey et al. |
| 2006/0107285 | A1 | 5/2006 | Medvinsky |
| 2006/0146822 | A1 | 7/2006 | Kolakowski et al. |
| 2006/0187897 | A1 | 8/2006 | Dabbs et al. |
| 2006/0189305 | A1 | 8/2006 | Ando et al. |
| 2006/0212582 | A1 | 9/2006 | Gupta et al. |
| 2006/0212592 | A1 | 9/2006 | Gupta et al. |
| 2006/0224748 | A1 | 10/2006 | Gupta et al. |
| 2006/0244588 | A1 | 11/2006 | Hannah et al. |
| 2006/0245367 | A1 | 11/2006 | Jeffery et al. |
| 2006/0253599 | A1 | 11/2006 | Monteiro et al. |
| 2006/0268750 | A1 | 11/2006 | Weiner |
| 2006/0274698 | A1 | 12/2006 | Twitchell |
| 2006/0276714 | A1 | 12/2006 | Holt et al. |
| 2006/0282544 | A1 | 12/2006 | Monteiro et al. |
| 2006/0288391 | A1 | 12/2006 | Puthiyedath |
| 2006/0294259 | A1 | 12/2006 | Matefi et al. |
| 2007/0001869 | A1 | 1/2007 | Hunzinger |
| 2007/0180032 | A1 | 8/2007 | Pearson |
| 2007/0182819 | A1 | 8/2007 | Monroe |
| 2007/0207785 | A1 | 9/2007 | Chatterjee et al. |
| 2008/0000979 | A1 | 1/2008 | Poisner |
| 2008/0002621 | A1 | 1/2008 | Ginzburg et al. |
| 2008/0002691 | A1 | 1/2008 | Qi et al. |
| 2008/0086700 | A1 | 4/2008 | Rodriguez et al. |
| 2008/0134054 | A1 | 6/2008 | Clark et al. |
| 2009/0063698 | A1 | 3/2009 | Xu et al. |
| 2009/0175425 | A1 | 7/2009 | Lee |
| 2010/0144320 | A1 | 6/2010 | Katis et al. |

FOREIGN PATENT DOCUMENTS

| | | |
|---|---|---|
| WO | WO 2006/114673 | 11/2006 |
| WO | WO 2007/026320 | 3/2007 |

OTHER PUBLICATIONS

Apple Inc., "*iPhone User's Guide*," http://manuals.info.apple.com/en_US/iPhone_User_Guide.pdf, Downloaded on Oct. 3, 2008, 154 pages.

Brandx.net, "*Using Talk*," http://www.brandx.net/support/usingtelnet/talk.shtml, Downloaded on Sep. 19, 2008, 2 pages.

Businesswire.com "*LignUp 4.0 Delivers Industry's Most Comprehensive Suite of Communications Web Services*," http://www.businesswire.com/portal/site/google/index.jsp?ndmViewId=news_view& newsId=20070430005498&newsLang=en, Downloaded on Nov. 21, 2008, 10 pages.

Calore, Michael, "*SpinVox Moves Into VoIP, Brings Voice-to-Text to Skype Users*," Monkey_Bites, http://blog.wired.com/monkeybites/2007/08/spinvox-moves-i.html, Downloaded on Oct. 3, 2008, 4 pages.
Cardci et al., "*MAC Layer QoS Support for Wireless Networks of Unmanned Air Vehicles*," Proceedings of the 37th Hawaii International Conference on System Sciences—2004, Jan. 5-8, 2004 pp. 9 pp.
Charny, Ben, "*Nextel pushes new 'push to talk' features*," URL: http://news.zdnet.com/2100-9584_22-134945.html, Mar. 18, 2004, 3 pages.
Chen et al., "*An Adaptive Multimedia Transmission Protocol for Distributed Multimedia Applications*," Proceedings of the 5th International Workshop on Multimedia Network Systems and Applications (MNSA'2003), in conjunction with The 23rd International Conference on Distributed Computing Systems (ICDCS-2003), 6 pages.
Dannen, Chris, "*Technology: The Skype Mobile Phone Will Blow Your Mind*," Dec. 18, 2007, URL: http://www.fastcompany.com/blog/chris-dannen/lab/technology-skype-mobile-phone-will-blow-your-mind, 2 pp.
Erwu et al., "*Packet-late indication based (PLIB): adaptive jitter buffer*," ACM International Conference Proceeding Series; vol. 58, Proceedings of the winter international symposium on Information and communication technologies, Cancun, Mexico, SESSION: Performance, reliability, and quality of service, pp. 1-5 Year of Publication: 2004.
FAQS.org, "*RFC1644—T/TCP—TCP Extensions for Transactions Functional S*," http://www.faqs.org/rfcs/rfc1644.html, Downloaded on Sep. 19, 2008, 26 pages.
FluidVoice "Overview of FluidVoice," http://viral.media.mit.edu/wiki/tiki-index.php?page=FluidVoice, Downloaded on Sep. 16, 2008, 2 pages.
GrandCentral.com, "*Call Record*," http://www.grandcentral.com/howitworks/call_record, Downloaded on Sep. 26, 2008, 1 page.
GrandCentral.com, "*One Voicemail Box*," http://www.grandcentral.com/home/one_voicemail, Downloaded on Sep. 26, 2008, 1 page.
GrandCentral.com, "*So Many Features, You Won't Believe it*," http://www.grandcentral.com/support/howitworks/, Downloaded on Sep. 26, 2008, 1 page.
GrandCentral.com, "*Voicemail forwarding*," http://www.grandcentral.com/howitworks/voicemail_forwarding, Downloaded on Sep. 26, 2008, 1 page.
Henshall, Stuart, "*HotRecorder—Record Skype Calls*," Skype Journal, URL: http://skypejournal.com/blog/archives/2005/03/hotrecorder_rec.php, Mar. 25, 2005, 11 pages.
IRCHelp.org, "*An IRC Tutorial*," http://www.irchelp.org/irchelp/irctutorial.html, Downloaded on Sep. 26, 2008, 14 pages.
Kadoink.com, "*Get a Widget*," http://www.kadoink.com/index.cfm?action=getWidgets, Downloaded on Sep. 19, 2008, 3 pages.
Krishnan et al., "*EVRC-Wideband: The New 3GPP2 Wideband Vocoder Standard*," IEEE International Conference on Acoustics, Speech and Signal Processing, 2007. ICASSP 2007, Publication Date: Apr. 15-20, 2007, vol. 2, on pp. 11-333-11-336, Honolulu, HI.
Layton, Julia, "*How Slingbox Works*," Jan. 4, 2006, HowStuffWorks.com, http://electronics.howstuffworks.com/slingbox.htm, 9 pages.
LignUp.com, "*LignUp Communications Applications Server*," http://www.lignup.com/platform/index.html, Downloaded on Sep. 19, 2008, 1 page.
Network Dictionary, "*Instant Message (IM) Technology Overview*," http://www.networkdictionary.com/networking/im.php, Downloaded on Sep. 16, 2008, 2 pages.
Nikotalkie.com, "*Nikotalkie—Home*," http://www.nikotalkie.com/, Downloaded on Sep. 19, 2008, 2 pages.
Nikotel.com, "*Click-Pop-Talk WebStart Phone*," http://www.nikotel.com/nikotel-click-pop-talk-java-phone.html, Downloaded on Sep. 19, 2008, 1 page.
Notaras, George, "*dircproxy IRC Proxy*," http://www.gloaded.eu/2007/02/01/dircproxy-irc-proxy/, Downloaded on Sep. 26, 2008, 4 pages.
Pash, Adam, "*Consolidate Your Phones with GrandCentral*," http://techgroup.groups.vox.com/library/post/6a00cd978dOef7f9cc00e398b8ff7a0002.html, Downloaded on Sep. 19, 2008, 5 pages.
Patel, Nilay, "*Apple patent reveals data-to-voice translation system for cellphones*," Jul. 28, 2007, URL: http://www.engadget.com/2007/07/28/apple-patent-reveals-data-to-voice-translation-system-for-cellph/, 5 pages.
Piecuch et al., "*A Selective Retransmission Protocol for Multimedia on the Internet*," In Proceedings of SPIE Multimedia Systems and Applications, Nov. 2000, Boston MA, USA, 12 pages.
Qiao et al., "*SCTP Performance Issue on Path Delay Differential*," Lecture Notes in Computer Science, Springer Berlin / Heidelberg ISSN 0302-9743 (Print) 1611-3349 (Online) vol. 4517/2007, Wired/Wireless Internet Communications, pp. 43-54 Sunday, Jun. 24, 2007.
Ramo et al., "*On comparing speech quality of various narrow- and wideband speech codecs*," Proceedings of the Eighth International Symposium on Signal Processing and Its Applications, 2005. Publication Date: Aug. 28-31, 2005, vol. 2, On pp. 603-606.
Rey et al., "*I-D ACTION:draft-ietf-avt-rtp-retransmission-09.txt*," Aug. 5, 2003, http://osdir.com/ml/ietf.avt/2003-08/msg00003.htm1, Downloaded on Sep. 19, 2008, 2 pages.
Ribbit.com, "*Amphibian*," http://www.ribbit.com/everyday/, Downloaded on Sep. 26, 2008, 1 page.
Ribbit.com, "*Enhanced Visual Voicemail*," http://www.ribbit.com/everyday/tour/enhanced_visual_voicemail.php, Downloaded on Sep. 26, 2008, 2 pages.
Ribbit.com, "*What is Ribbit? Features*," http://www.ribbit.com/platform/features.php, Downloaded on Sep. 26, 2008, 1 page.
Ribbit.com, "*What is Ribbit? Overview*," http://www.ribbit.com/platform/index.php, Downloaded on Sep. 26, 2008, 1 page.
Ribbit.com, "*What is Ribbit? Voice Architecture*," http://www.ribbit.com/platform/architecture.php, Downloaded on Sep. 26, 2008, 2 pages.
Saito et al., "*IP Packet Loss Compensation Scheme with Bicast and Forwarding for Handover in Mobile Communications*," 2006 IEEE 17th International Symposium on Personal, Indoor and Mobile Radio Communications, Sep. 2006, pp. 1-5, Helsinki.
Skype.com, "*Making calls is just the start*," URL: http://www.skype.com/features/, Downloaded on Sep. 16, 2008, 2 pages.
Spinvox.com, "*Home Page*," http://www.spinvox.com/, Downloaded on Sep. 26, 2008, 3 pages.
Spinvox.com, "*How Does it Work?*," http://www.spinvox.com/how_it_works.html, Downloaded on Sep. 19, 2008, 2 pages.
Swissvoice.net, "*PSTN*," http://www.swissvoice.net/ww/htm_ww/08_technology/content_pstn.html, Downloaded on Sep. 19, 2008, 3 pages.
Tektronix, "*VOIP Technology Overview; Protocols, Convergence, Testing*," http://www.tektronics.com/voip, May 12, 2006.
The Jabber Extensible Communications Platform™, "*Products // Jabber XCP*," URL: http://www.jahher.com/CE/JahherXCP, Downloaded on Sep. 16, 2008, 2 pages.
ThunkDifferent.com, "*YouMail vs. Google Grandcentral Voice Mail Service*," http://thunkdifferent.com/2007/10/11/youmail-vs-google-grandcentral-voice-mailservice!, Downloaded on Oct. 3, 2008, 6 pages.
VOIP-News.com, "*Company Profile, LignUp,* " http://www.voip-news.com/vendors/lignup/, Downloaded on Dec. 5, 2008, 6 pages.
WikiBooks, "*Internet Technologies/IRC*," http://en.wikibooks.org/wiki/Internet_Technologies/IRC, Downloaded on Sep. 19, 2008, 4 pages.
WikiPedia—The Free Encyclopedia, "*E-mail*," http://en.wikipedia.org/wiki/E-mail, Downloaded on Sep. 19, 2008, 8 pages.
WikiPedia—The Free Encyclopedia, "*Internet Relay Chat*," http://en.wikipedia.org/wiki/Internet_Relay_Chat, Downloaded on Oct. 3, 2008, 11 pages.
WikiPedia—The Free Encyclopedia, "*Spinvox*," http://en.wikipedia.org/wiki/Spinvox, Downloaded on Sep. 26, 2008, 1 page.
WikiPedia—The Free Encyclopedia, "*TiVo*", http://en.wikipedia.org/wiki/TiVo, Downloaded on Sep. 16, 2008, 6 pages.
Yavuz et al., "*VoIP over cdma2000 I$_x$EV-DO Revision A*," IEEE Communications Magazine, Feb. 2006, pp. 88-95.

HotRecorder.com, "*Features*," http://www.hotrecorder.com/music_features.asp, downloaded on Sep. 26, 2008, 1 page.
HotRecorder.com, "*Help*," http://www.hotrecorder.com/music_help.asp, downloaded on Sep. 26, 2008, 3 pages.
HotRecorder.com, "*FAQs*," http://www.hotrecorder.com/music_support.asp, downloaded on Sep. 26, 2008, 1 page.
WikiPedia—The Free Encyclopedia, "*Skype*," http://en.wikipedia.org/wiki/Skype, Downloaded on Sep. 26, 2008, 7 pages.
WikiPedia—The Free Encyclopedia, "*Skype Protocol*," http://en.wikipedia.org/wiki/Skype, Downloaded on Sep. 26, 2008, 4 pages.
Jabber.org, "*Main Page*," http://www.jabber.org/web/main_page, Sep. 2, 2008, downloaded on Sep. 26, 2008, 1 page.
Jabber.org, "*FAQ*," http://www.jabber.org/web/faq, Sep. 4, 2008, downloaded on Sep. 26, 2008, 2 pages.
Apple Inc., "*iPhone: About Visual Voicemail*," http://www.support.apple.com/kb/HT1486, Downloaded on Sep. 26, 2008, 3 pages.
Jabber.org, "*Products // Jabber XCP // Benefits*," http://www.jabber.com/CE/JabberXCPBenefits, downloaded on Sep. 26, 2008, 1 page.
Jabber.org, "*Products //Jabber Clients*," http://www.jabber.com/CE/JabberClients, downloaded on Sep. 26, 2008, 1 page.
Jabber.org, "*Products // JabberNow*" http://www.jabber.com/CE/JabberNow, downloaded on Sep. 26, 2008, 1 page.
KillerStartups.com, "*Kadoink.com—Mobilizing your Socializing*," http://www.killerstartups.com/Web20/kadoink-com-moblizing-your-socializing, Downloaded on Sep. 26, 2008, 3 pages.
CNETNews.com, "*Kadoink's phonecast lines officially open for texting*," http://news.cnet.com/8301-17939_109-9829877-2.html, downloaded on Sep. 26, 2008, 1 page.
BusinessWire.com, "*LignUp 4.0 Delivers Industry's Most Comprehensive Suite of Communications Web Services*," Apr. 30, 2007, http://www.businesswire.com/portal/site/google/?ndmViewId=news_view&newsId=20070430005498&newsLang=en, Downloaded on Sep. 26, 2008, 6 pages.
VOIP-News.com, "*Company Profile—LignUp*," http://www.voip-news.com/vendors/lignup/, Downloaded on Oct. 3, 2008, 6 pages.
JustAnotheriPhoneBlog.com, "*Nikotalkie—Just Talk, Don't Type*," http://justanotheriphoneblog.com/wordpress/2007/10/13/nikotalkie-just-talk-donttype/, Downloaded on Sep. 26, 2008, 10 pages.
WikiPedia—The Free Encyclopedia, "*Push to Talk*" http://en.wikipedia.org/wiki/Push_to_talk, Downloaded on Sep. 26, 2008, 3 pages.
WikiPedia—The Free Encyclopedia, "Slingbox" http://en.wikipedia.org/wiki/Slingbox, Downloaded on Sep. 26, 2008, 4 pages.
About.com, "*Linux / Unix Command: talk*,"http://linux.about.com/od/commands/l/b1cmdll_talk.htm, Downloaded on Sep. 26, 2008, 2 pages.
Fall, Kevin, "*A Delay-Tolerant Network Architecture for Challenged Internets*," Feb. 2003, http://www.dtnrg.org/docs/papers/IRB-TR-03-003.pdf, 15 pages.
Chuah et al., "*Store-and-Forward Performance in a DTN*," Vehicular Technology Conference, 2006. VTC 2006-Spring. IEEE 63rd, Publication Date: May 7-10, 2006, vol. 1, On pp. 187-191.
Krishnan, et al., "*The SPINDLE Disruption-Tolerant Networking System*," Military Communications Conference, 2007. MILCOM 2007. IEEE Volume , Issue , Oct. 29-31, 2007 pp. 1-7.
WikiPedia—The Free Encyclopedia, "*Visual Voicemail*" http://en.wikipedia.org/wiki/Visual_voicemail, downloaded on Sep. 26, 2008, 1 page.
Amir et al., "*An Overlay Architecture for High Quality VoIP Streams*,", IEEE Transactions on Multimedia, Publication Date: Dec. 2006, vol. 8, Issue:6, On pp. 1250-1262.
Rothermel et al., "*An Adaptive Stream Synchronization Protocol*," Lecture Notes in Computer Science; vol. 1018, Proceedings of the 5th International Workshop on Network and Operating System Support for Digital Audio and Video, pp. 178-189, Year of Publication: 1995.
Baset et al., "*An Analysis of the Skype Peer-to-Peer Internet Telephony Protocol*," INFOCOM 2006. 25th IEEE International Conference on Computer Communications. Proceedings (2006), pp. 1-11.
Cerf et al., "*A Protocol for Packet Network Intercommunication*," Communications, IEEE Transactions on, vol. 22, Issue 5, May 1974 pp. 637-648.
U.S. Appl. No. 12/607,000, filed Oct. 27, 2009.
WikiPedia—The Free Encyclopedia, "Eudora_(email_client)," http://en.wikipedia.org/wiki/Eudora (e-mail client), Downloaded on Aug. 20, 2009, 3 pages.
"*Eudora*," Answers.com, http://www.answers.com/topic/eudora-e-mail-client, Downloaded on Aug. 20, 2009, 4 pages.
"*The Eudora Open Messaging Advantage*," Qualcomm, 1997, Part No. 100-50030-1, 23 pages.
"*Aspera—Next Generation File Transport—Broadcasting & Entertainment Media*," Asperasoft.com, http://www.asperasoft.com/en/industries/digital_media_10/Broadcast_Entertainment_Media_5, Downloaded on Sep. 22, 2009, 2 pages.
"*Aspera—Next Generation File Transport—fasp™ transfer times*," Asperasoft.com, http://www.asperasoft.com/en/technology/fasp_transfer_times_14/fasp_transfer_times_14, Downloaded on Sep. 22, 2009, 1 page.
"*Aspera—Next Generation File Transport—the fasp solution*," Asperasoft.com, http://www.asperasoft.com/en/technology/fasp_solution_3/the_fasp_solution_3, Downloaded on Sep. 22, 2009, 3 pages.
"*Aspera—Next Generation File Transport—the shortcomings of TCP file transfer*," Asperasoft.com, http://www.asperasoft.com/en/technology/shortcomings_of TCP_2/the_shortcomings_of_TCP_file_transfer_2, Downloaded on Sep. 22, 2009, 2 pages.
"*Aspera—Next Generation File Transport—fasp technology overview*" Asperasoft.com, http://www.asperasoft.com/en/technology/fasp_overview_1/fasp_technology_overview_1, Downloaded on Sep. 22, 2009, 2 pages.
"*Aspera fasp™ High Speed Transport-A Critical Technology Comparison*," White Paper, Asperasoft.com, http://www.asperasoft.com/en/technology/white_papers_13/aspera_fasp_high_speed_transport_13, Downloaded on Sep. 22, 2009, 11 pages.
"*Palringo Brings First Push-to-Talk Application to the iPhone*," RedOrbit.com, http://www.redorbit.com/news/technology/1525545/palringo_brings_first_pushtotalk_application_to_the_iphone/index.html, Downloaded on Aug. 13, 2009, 2 pages.
*Palringo—Features*, Palringo.com, http://www.palringo.com/en/gb/features/, Downloaded on Aug. 13, 2009, 1 page.
Moren, Dan, "*Palringo Brings Picture Messaging to Iphone*," http://www.pcworld.com/article/149108/palringo_brings_picture_messaging_to_iphone. html, Downloaded on Aug. 13, 2009, 3 pages.
Paul, Ryan, "*Gmail gets Google Talk integration*," Arstechnica.com, http://arstechnica.com/old/content/2006/2-6128.ars , Downloaded on Aug. 20, 2009, 1 page.
Sherman, Chris, "*Google Integrates Chat with Gmail*," Search Engine Watch, http://searchenginewatch.com/3583121, Feb. 7, 2006, Downloaded on Aug. 20, 2009, 2 pages.
"*About Gmail*," http://mail.google.com/mail/help/chat.html, Downloaded on Aug. 20, 2009, 3 pages.
WikiPedia—The Free Encyclopedia, "*Google Talk*," http://en.wikipedia.org/wiki/Google_Talk, Downloaded on Aug. 20, 2009, 8 pages.
Azuri, Calvin, "*Palringo Gold Launched on BlackBerry Smartphone*", Apr. 20, 2009, http://ivr.tmcnet.com/topics/ivr-voicexml/articles/54573-palringo-gold-launched-blackberry-smartphone.htm, Downloaded on Aug. 13, 2009, 3 pages.
Liaw, Kim Poh, "*Pairingo launches its IM Software for Android Phones*," Slashphone.com, Mar. 24, 2009, http://www.slashphone.com/palringo-launches-its-im-software-for-android-phones-245111, Downloaded on Aug. 13, 2009, 8 pages.
WikiPedia—The Free Encyclopedia, "*Pairingo*" http://en.wikipedia.org/wiki/Palringo, Downloaded on Aug. 13, 2009, 1 page.

\* cited by examiner

MOBILE COMMUNICATION DEVICE, METHOD, AND SYSTEM FOR REDUCING EXPOSURE TO RADIO FREQUENCY ENERGY DURING TRANSMISSIONS BY TRANSMITTING MEDIA IN/OUT WHILE THE MOBILE COMMUNICATION DEVICE IS SAFE DISTANCE AWAY FROM USER

CROSS-REFERENCE TO RELATED APPLICATIONS

This application claims the benefit of priority to U.S. Provisional Patent Application No. 61/120,288 filed Dec. 5, 2008, entitled "Communication System and Method", incorporated herein by reference for all purposes.

BACKGROUND

1. Field of the Invention

This invention relates to electronic communications, and more particularly, to a mobile communication device and method for reducing exposure to radio frequency energy during transmissions.

2. Description of Related Art

Mobile telephones and other wireless communication devices generate radio frequency (RF) energy during both outgoing and incoming transmissions. The main source of the RF energy is produced through the antenna of the device, which is typically either embedded in or affixed to the device itself. During a call, the antenna is often placed adjacent to the head of the user. The closer the antenna is to the head, the greater the level of exposure to RF energy.

The intensity of the RF energy emitted by a mobile telephone or other wireless communication devices depends on the strength of the radio signal sent to or from the nearest base station. ☐When a call is placed from a mobile phone for example, a radio signal is sent from the antenna of the phone to the nearest base station. The base station routes the call through a switching center, where the call is transferred to another mobile telephone, another base station, or a landline telephone system. The farther the mobile telephone is from the base station, the higher the power level of the radio signal needed to maintain the connection. This distance determines, in part, the amount of RF energy exposure to the user.

A number of other factors also determine the amount of RF exposure to the user. These factors may include (i) the number of calls in which the user participates, (ii) the duration of the calls, (iii) the quality of the transmissions, (iv) the amount of traffic on the wireless network during the calls, and (v) the possible use of a hands-free device.

Currently there is a great deal of concern that RF energy produced by mobile phones and other wireless communication devices may affect the brain and nervous system of users. Since devices are usually held close to the head, medical researchers have focused on whether RF energy can cause either malignant or nonmalignant tumors in the brain, in and around the ears, the spinal cord and surrounding areas. Consequently numerous studies have been performed to investigate the relationship between mobile telephone usage and the risk of developing tumors. Although results of these studies have been inconclusive to date, the link between the use of mobile phones and cancer remains a significant fear.

SUMMARY OF THE INVENTION

A mobile communication device and method for reducing exposure to radio frequency (RF) energy during outgoing and incoming transmissions is disclosed. During outgoing transmissions, media is stored in a local storage element on the mobile communication device as the media is being created. When the device is positioned a safe distance away from the user, the media is transmitted out of storage over the network to the recipient. Alternatively for incoming transmissions, media is stored on the network as it is created. While the wireless communication device is a safe distance away from the user, the media stored on the network is transmitted to the mobile communication device, where it is locally stored. The user of the mobile communication device can then review the incoming media at an arbitrary later time out of storage. As a result, the exposure of the user of the mobile communication device to RF energy for both outgoing and incoming transmissions is either substantially reduced or eliminated altogether.

BRIEF DESCRIPTION OF THE DRAWINGS

The invention may best be understood by reference to the following description taken in conjunction with the accompanying drawings, which illustrate specific embodiments of the invention.

It should be noted that like reference numbers refer to like elements in the figures.

DETAILED DESCRIPTION OF SPECIFIC EMBODIMENTS

The invention will now be described in detail with reference to various embodiments thereof as illustrated in the accompanying drawings. In the following description, specific details are set forth in order to provide a thorough understanding of the invention. It will be apparent, however, to one skilled in the art, that the invention may be practiced without using some of the implementation details set forth herein. It should also be understood that well known operations have not been described in detail in order to not unnecessarily obscure the invention.

Figure 1A:
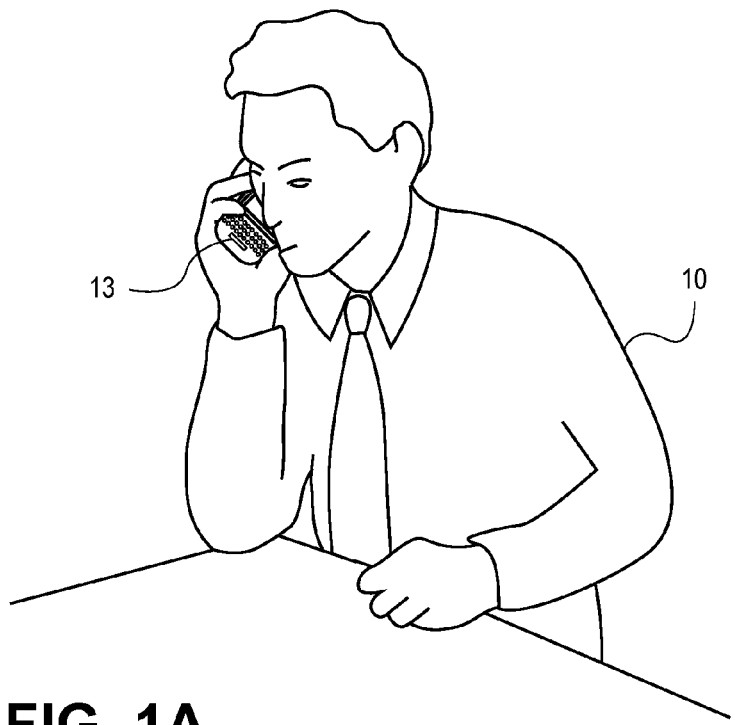
FIGS. 1A and 1B are diagrams illustrating how an RF protection mode on a mobile communication device protects a user from exposure from RF energy by enabling the user to create media and then transmit the media in a burst mode when the device is a safe distance away from the user.
Figure 1B:
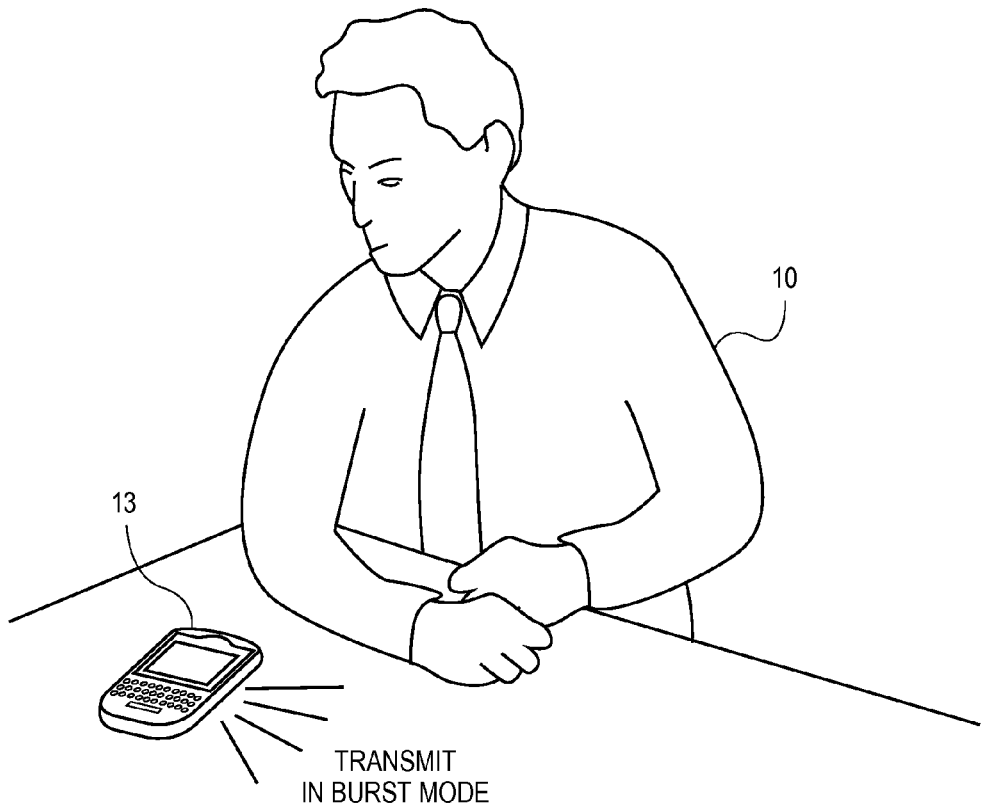

Referring to FIGS. 1A and 1B, diagrams are shown illustrating how an RF protection mode on a mobile communication device 13 protects a user 10 from exposure to RF energy during outgoing transmissions. In FIG. 1A, the user 10 of the device 13 is creating media for an outgoing transmission. With the RF protection mode, however, the media is locally stored in device 13, rather than being transmitted as it is created as with a conventional phone call. In FIG. 1B, the media is transmitted in a burst mode after the device 13 has been moved or otherwise positioned a safe distance away from the head of the user 10. By transmitting from storage when the device 13 is no longer adjacent the head of the user 10, the amount of RF exposure, and the accompanying tumor risks, are substantially reduced or altogether eliminated.

In the example of FIGS. 1A and 1B illustrate the typically situation of how and when the RF protection mode is implemented. It should be understood, however, that this example should not be construed as limiting. The positioning of the device 13 a safe distance away from the user is not necessarily limited to just away from the head of the user. Rather a "safe" distance or position should be construed as any position or distance that limits or otherwise reduces the amount of RF exposure to the user. For example, a safe distance or position may mean entirely away from the body of the user, a predetermined distance away from the head or body of the user, when the user is in a different room or location from the device 13 during burst transmission, etc. Thus "safe" distance or position is intended to be broadly construed to mean any distance or position that results in reduced RF exposure during voice transmissions in the burst mode, relative to the transmission of the media as the media is being created.

Figure 2:
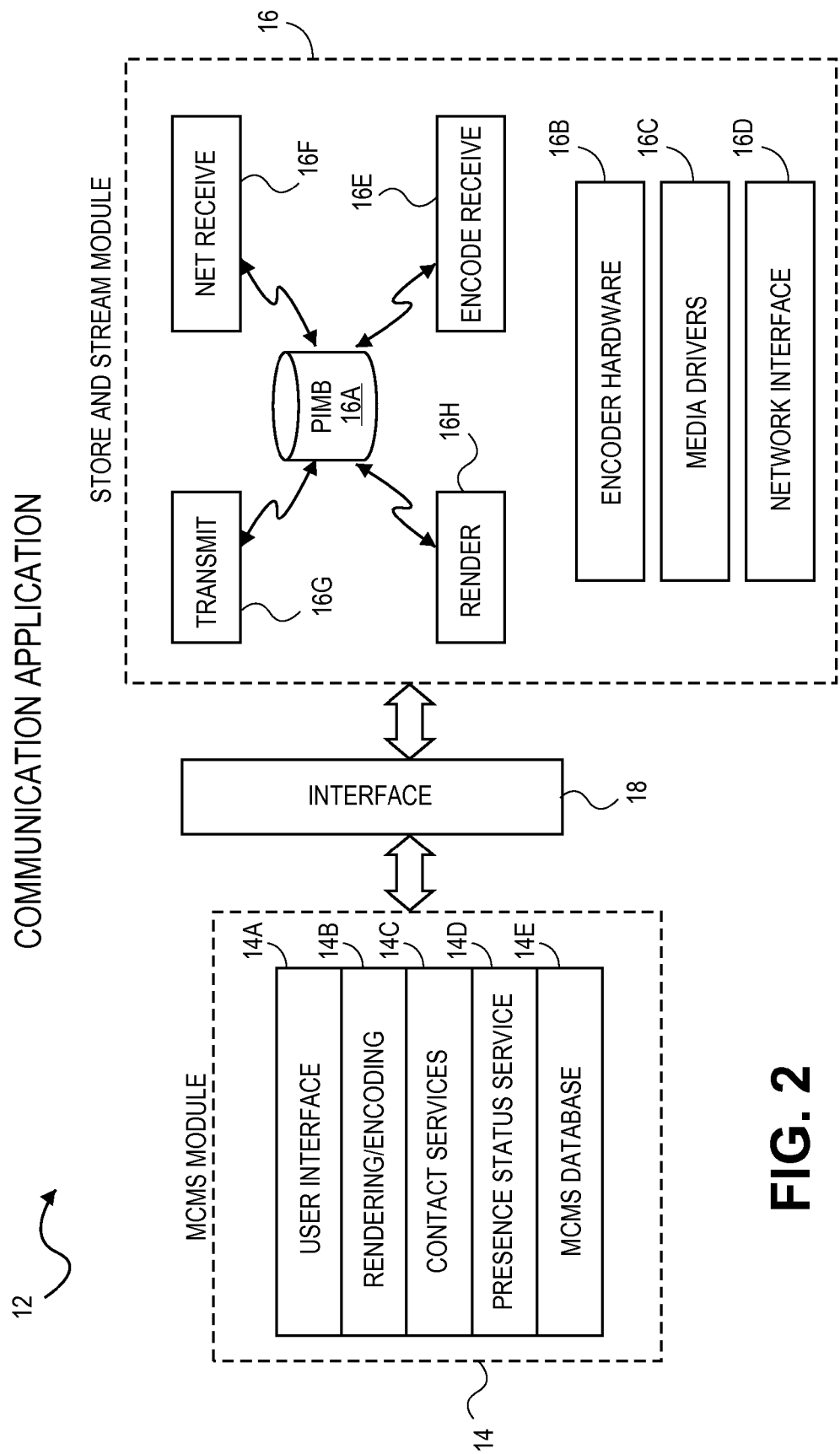
FIG. 2 is a diagram of a client application configured to run on mobile communication devices according to the invention.

Referring to FIG. 2, a block diagram of a client application 12 intended to run on a mobile communication device 13 is shown. The client 12 includes a Multiple Conversation Management System (MCMS) module 14, a Store and Stream module 16, and an interface 18 provided between the two modules. As described in detail in co-pending, commonly assigned U.S. application Ser. No. 12/028,400 (U.S. Patent Publication 2009/0003558), Ser. No. 12/253,833 (U.S. Patent Publication 2009/0168760), Ser. No. 12/253,820 (U.S. Patent Publication 2009/0168759) and Ser. No. 12/253,833 (U.S. Patent Publication 2009/0168760), all incorporated herein by reference, the client application 12 enables new modes of communication. More specifically, the client application 12 enables devices 13 to engage in conversations either (i) synchronously in a near real-time mode, similar to a conventional "live" phone call or (ii) asynchronously in a time-shifted mode, and (iii) provides the ability to seamlessly transition a conversation between the two modes (i) and (ii). The key modules and services of the client application 12 are briefly described below. For a more detailed explanation, see the above-listed co-pending applications.

The MCMS module 14 includes a user interface module 14A for supporting audio and video functions on the device 13. A rendering/encoding module 14B is provided for performing rendering and encoding tasks. A contact services module 14C manages and maintains the information needed for creating and maintaining contact lists (e.g., telephone numbers and/or email addresses). A presence status service module 14D is provided for sharing the online status of the user 10 of the device 13 with others, and to also indicate the online status of others on the network. Finally, the MCMS database 14E stores and manages the meta data for conversations conducted using the device 13.

The Store and Stream module 16 includes a PIMB 16A for progressively and simultaneously storing in a time-indexed format outgoing and incoming media. Encoder hardware 16B is provided encoding media, such as voice, generated using the device 13 as the media is being created. Media drivers/encoders 16C are provided for (a) driving media generating components, such as a speaker and/or a display and (b) encoding the media created on device 13, using for example a microphone, camera, keyboard, mouse, touch-sensitive display, etc., either located on or associated with device 13. A wireless network interface 16D connects the device 13 to a wireless network. Encode receive module 16E is provided for receiving, encoding, and storing the media created using the device 13 in the PIMB 16A in the time-indexed format. The net receive module 16F performs the function of storing in the PIMB 16A the media received from others over the network in the time-indexed format. The transmit module 16G is responsible for transmitting the media of messages created on the device 13 to other recipients over the network, either as the media is being created or out of the PIMB 16A. Finally, the render module 16H enables the user of the device 13 to control the rendering of media either (i) in the near real-time mode or (ii) in the time-shifted mode out of the PIMB 16A and (iii) to seamlessly transition between the two modes (i) and (ii). The elements 16A through 16AH of the store and stream module 16 operate progressively and simultaneously with each other. As a result, media may be simultaneously and progressively encoded, stored in the PIMB 16A, and transmitted as the media is created using the device 13. Alternatively, incoming media may also be simultaneously and progressively stored in the PIMB 16 and rendered.

The RF protection mode is preferably implemented just in the time-shifted mode. When a user wishes to engage in a conversation "live" in the near real-time mode, then the RF protection mode is turned off. With time-shifted conversations, however, the RF protection feature is on, protecting the user during both outgoing and incoming transmissions. In various embodiments, the RF protection mode can automatically be switched between on and off, depending on if the user 10 is communicating in either the real-time mode or the time-shifted mode respectively. In other embodiments, the user 10 may manually set the RF protection mode either on or off.

Figure 3:
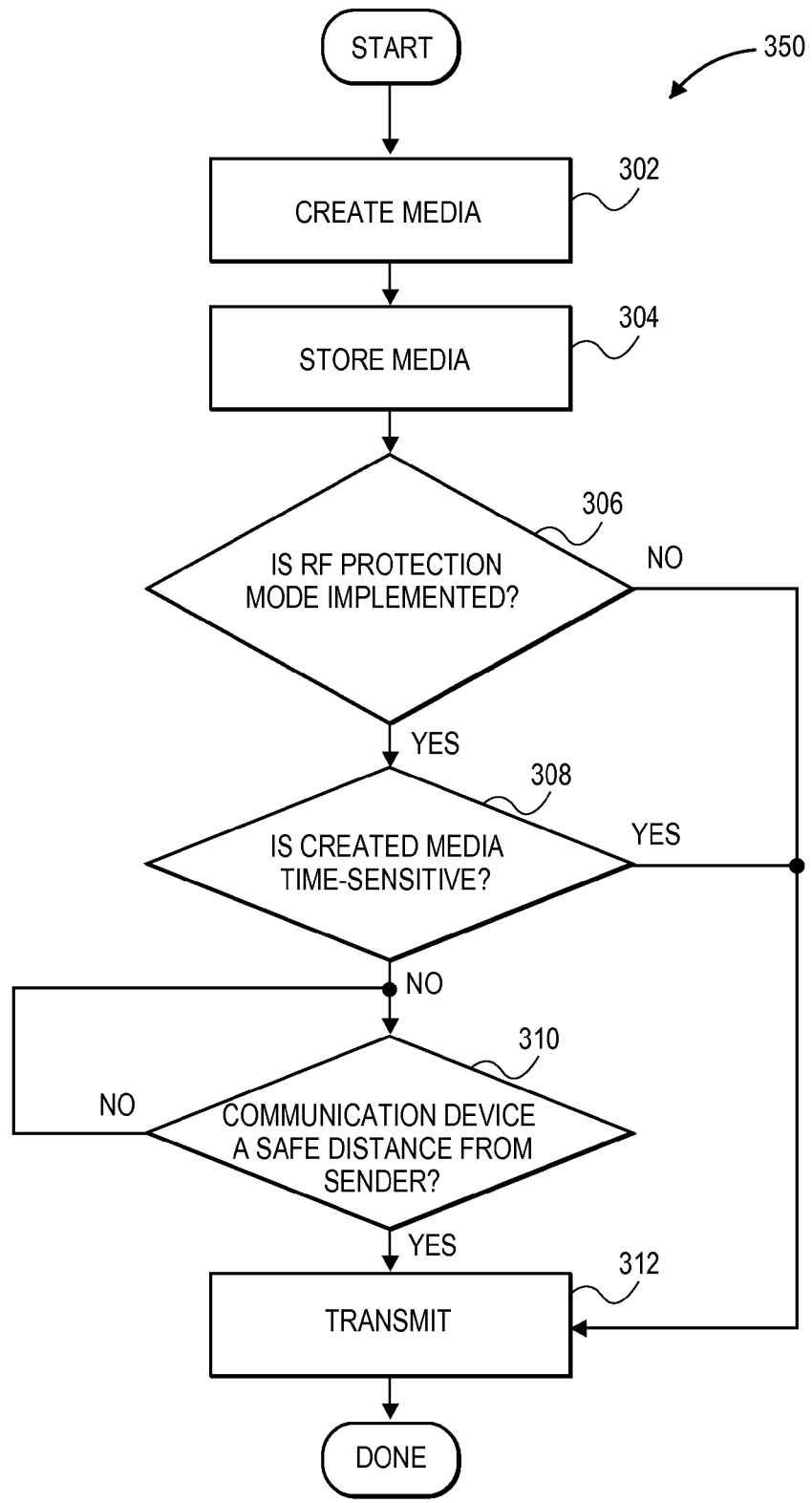
FIG. 3 is a flow diagram illustrating the sequence for the creation and subsequent transmission of media from a mobile communication device in the RF protection mode according to the invention.

Referring to FIG. 3, a flow diagram illustrating the sequence for the transmission of media from a mobile communication device 13 in the RF protection mode is shown. In the initial step 302, media is created, typically when the user 10 is holding the device 13 next to his head, and is speaking into the microphone. As the media is being created, it is stored in the PIMB 16A (step 304). Next it is determined (decision 306) if the RF protection mode is on or off. If not implemented (i.e., off), then the media is simultaneously and progressively transmitted (step 312) as it is being created (302) and stored (304) in the PIMB 16A.

When the RF protection mode is implemented (i.e., on), then it is determined (decision 308) if the media is either time-sensitive or not time sensitive. If the recipient is online and rendering the media "live" in the real-time mode, as determined by the presence status service module 14D, then the media is considered time-sensitive. Since the media is time-sensitive, it is simultaneously and progressively transmitted (step 312) as the media is created. A live conversation therefore overrides the RF protection mode feature with certain embodiments embodiments.

If the recipient is not rendering the media "live" in the near real-time mode, then it is assumed that the media is not time-sensitive. As the media is not time-sensitive, there is no reason to transmit the media to the recipient as the media is created. Accordingly with non time-sensitive media, it is continually determined (decision 310) if the device 13 is a safe distance away from the user 10. If the distance is not safe, typically because the user is still talking into the device 13, then the media is not transmitted. When the user is eventually done creating the message, and the device 13 is positioned a safe distance away, for example by placing the device 13 on a desk or other location away from the head of the user, then the media is transmitted (step 312) out of the PIMB 16A in a burst mode. By transmitting the created media only after the device 13 is positioned at a safe location, the amount of RF exposure to the user 10 is reduced or substantially eliminated.

The process described above protects a user 10 of a device 13 from RF energy during the transmission of outgoing messages. The RF protection mode, however, can also protect a user from RF energy during the transmissions of incoming messages as explained below.

Figure 4:
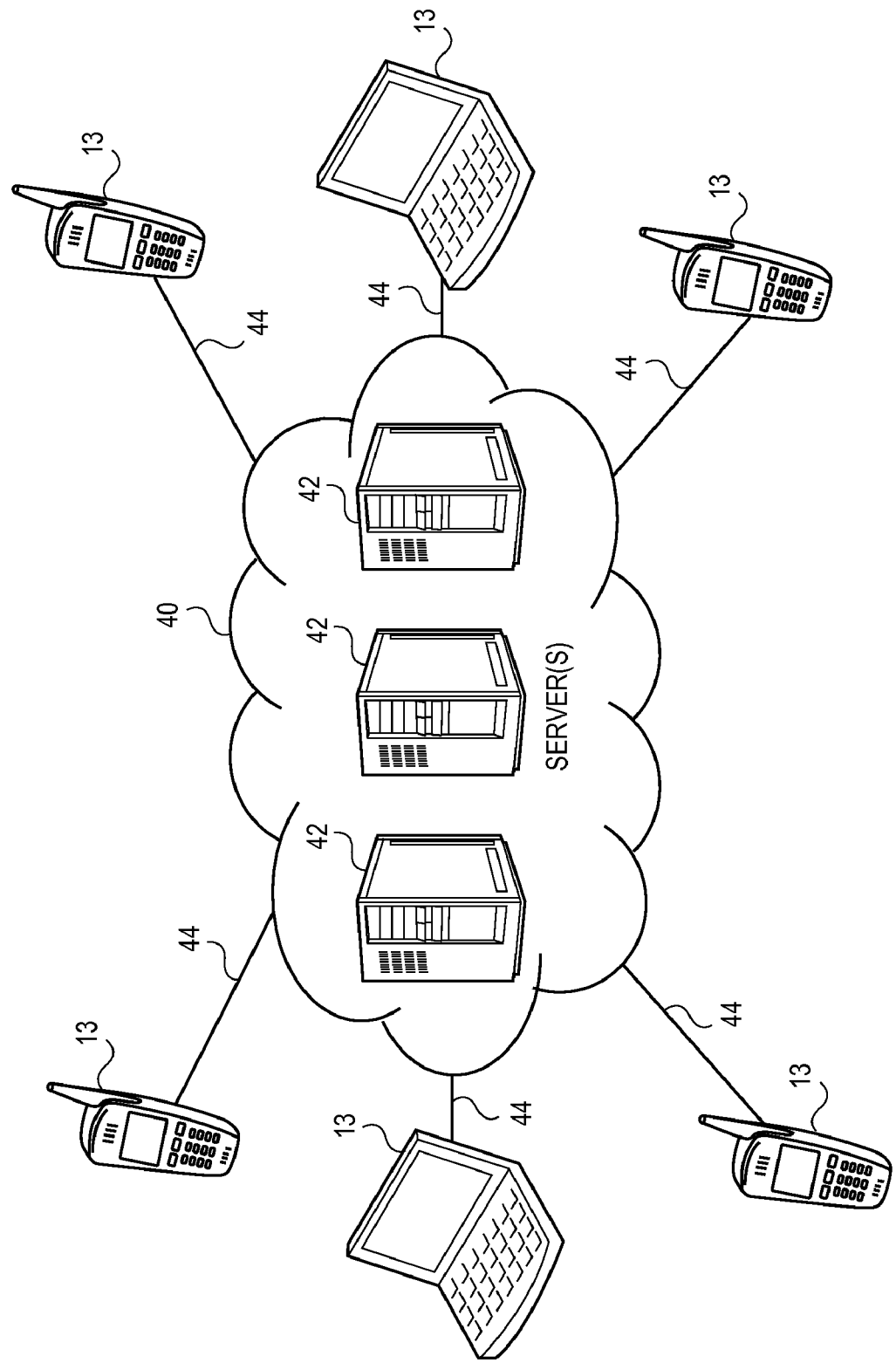
FIG. 4 is a diagram of a communication network according to the present invention.

Referring to FIG. 4, a diagram of a communication services network 40 is shown. The communication services network 40 includes one or more servers 42. One or more client 12 enabled communication devices 13 are connected to the network 40 through one or more networks 44 respectively. In various embodiments, the networks 44 may each be the Public Switched Telephone Network (PSTN), a cellular network based on CDMA or GSM for example, the Internet, a tactical radio network, any other communication network, or a combination thereof. The communication services network 40 is a network layer on top of or otherwise in communication with the underlying networks 44. In various embodiments, the network layer 40 is either heterogeneous or homogeneous. The individual communication devices 13 may communicate with one another through one or more server 42 hops across the communication services network 40 and their underlying network 44 respectively.

The one or more servers 42 run a communication application responsible for routing the meta data used to set up and support conversations as well as route the actual media of conversations between communication devices 13. The communication application on the servers 42 is very similar to client application 12, except many of the rendering and encoding modules are removed, since these functions are typically not performed at server 42 locations on the network 40. In one specific embodiment, the application is the server application described in commonly assigned co-pending U.S. application Ser. No. 12/028,400 (U.S Patent Publication No. 2009/0003558), Ser. No. 12/192,890 (U.S Patent Publication No. 2009/0103521), and Ser. No. 12/253,833 (U.S Patent Publication No. 2009/0168760), each incorporated by reference herein for all purposes.

The communication application running on the servers 42 include a PIMB. With a PIMB located at each server 42, media may be stored on the network 40. With storage on the network, media may be transmitted to the communication device 13 of a recipient only when it is safe to do so, rather than when the media is created. As a result, the recipient user 10 may be protected from RF energy during incoming transmissions.

Figure 5:
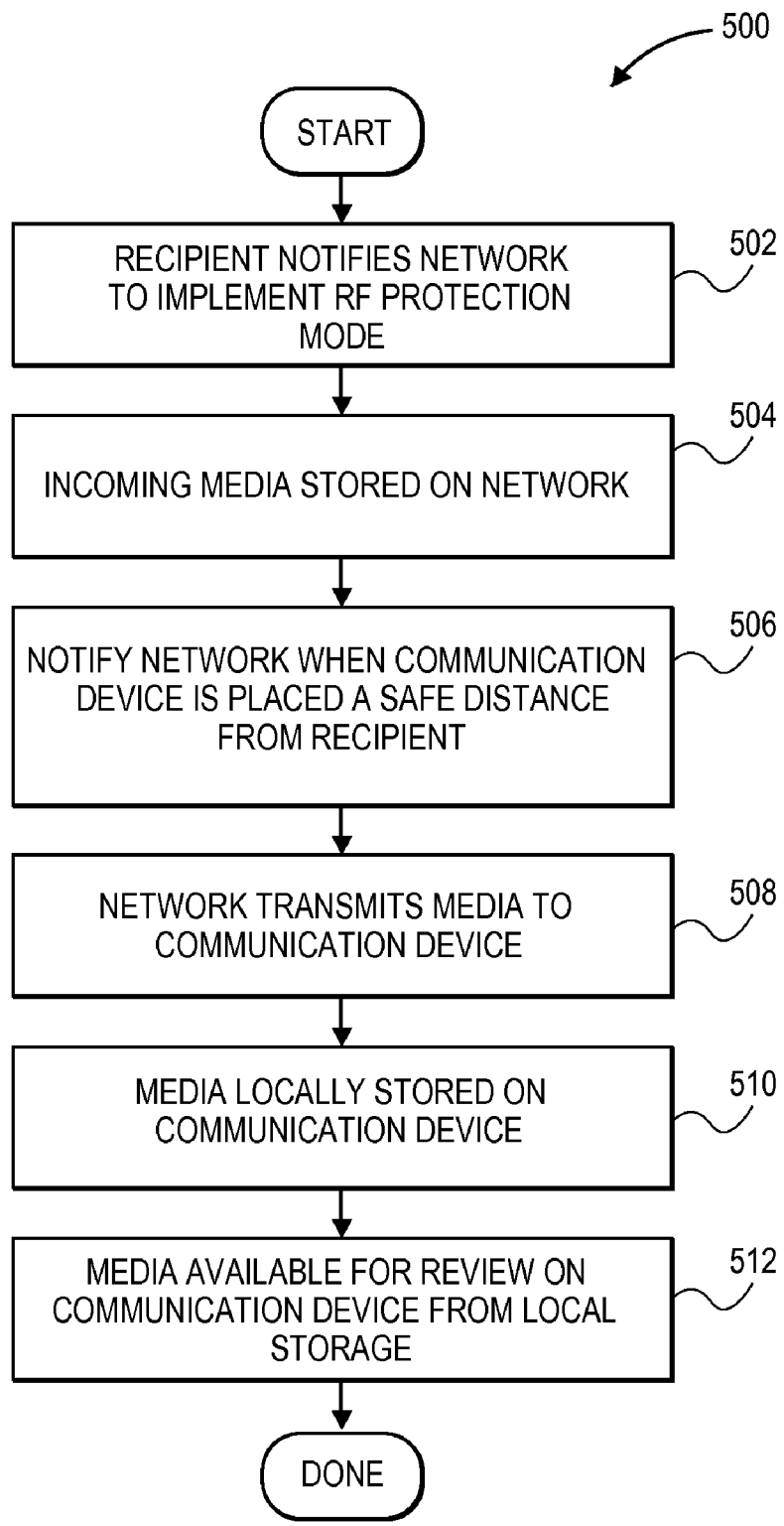
FIG. 5 is a flow diagram illustrating the sequence for receiving and rendering media at a mobile communication device in the RF protection mode in accordance with the invention.

Referring to FIG. 5, a flow diagram illustrating the sequence for receiving media at a mobile communication device 13 in the RF protection mode is shown. In the initial step 502, the recipient notifies the network 40 that the RF protection mode is implemented (i.e., on). In various embodiments, the recipient may notify the network 40 in any number of ways, for example, by using their client 12 enabled communication device 13, or by using another communication device. In the latter embodiment, the recipient may use their personal computer to notify the network 40 to implement the RF protection mode for their mobile phone for example, or vice-versa.

In response, all incoming media is stored in the PIMB of the one of more server 42 hops on the network 40 (step 504) between the sending and receiving devices 13. In accordance with various embodiments, the notification may be explicit or may be inferred. For example, the recipient device 13 may send an explicit command signal to the network, requesting that the RF protection mode be implemented. Alternatively, the RF protection mode may be implemented based on the behavior of the recipient. If the recipient is not using their device 13 during a "live" conversation in the real-time mode, the device may automatically notify the network 40 to implement the RF protection mode. Regardless of how the RF protection is implemented, incoming media is stored in at least one PIMB on the one or more server 42 hops on the network 40, without immediately being forwarded to the recipient. In subsequent step 506, the network is notified with a "safe-to-transmit" message when the communication device 13 is placed a safe distance from the recipient. In reply, the media is transmitted (step 508) from the at least one PIMB to the device 13 of the recipient. The media is then locally stored in the PIMB 16A (step 510) on device 13, whereupon the media is available for rendering by the user at an arbitrary later time (step 512).

The safe-to transmit message may be generated in response to an explicit input from the recipient user 10. For example, a recipient may wish to retrieve his/her messages stored on the network 40, with little to no exposure to RF energy. To do so, the recipient may enter an explicit command, which causes the safe-to-transmit message to be sent to the network 40 as soon as the device 13 is placed a safe distance away. In another embodiment, the recipient user may set a timer, which causes the safe-to-transmit message to be sent to the network 40 after a predetermined period of time. So long as the user 10 places the device 13 in a safe location, the user 10 will not be exposed to RF energy when the incoming transmission occurs after the predetermined period of time. In yet another embodiment, the safe-to-transmit message may automatically be generated whenever the device 13 is in a safe position away from the user. As a result whenever a sender creates media when it is safe to transmit, the media will immediately be transmitted to the device 13. In variations of this embodiment, the media may or may not also be stored in the at least one PIMB of the one or more server 42 hops.

Figure 6:
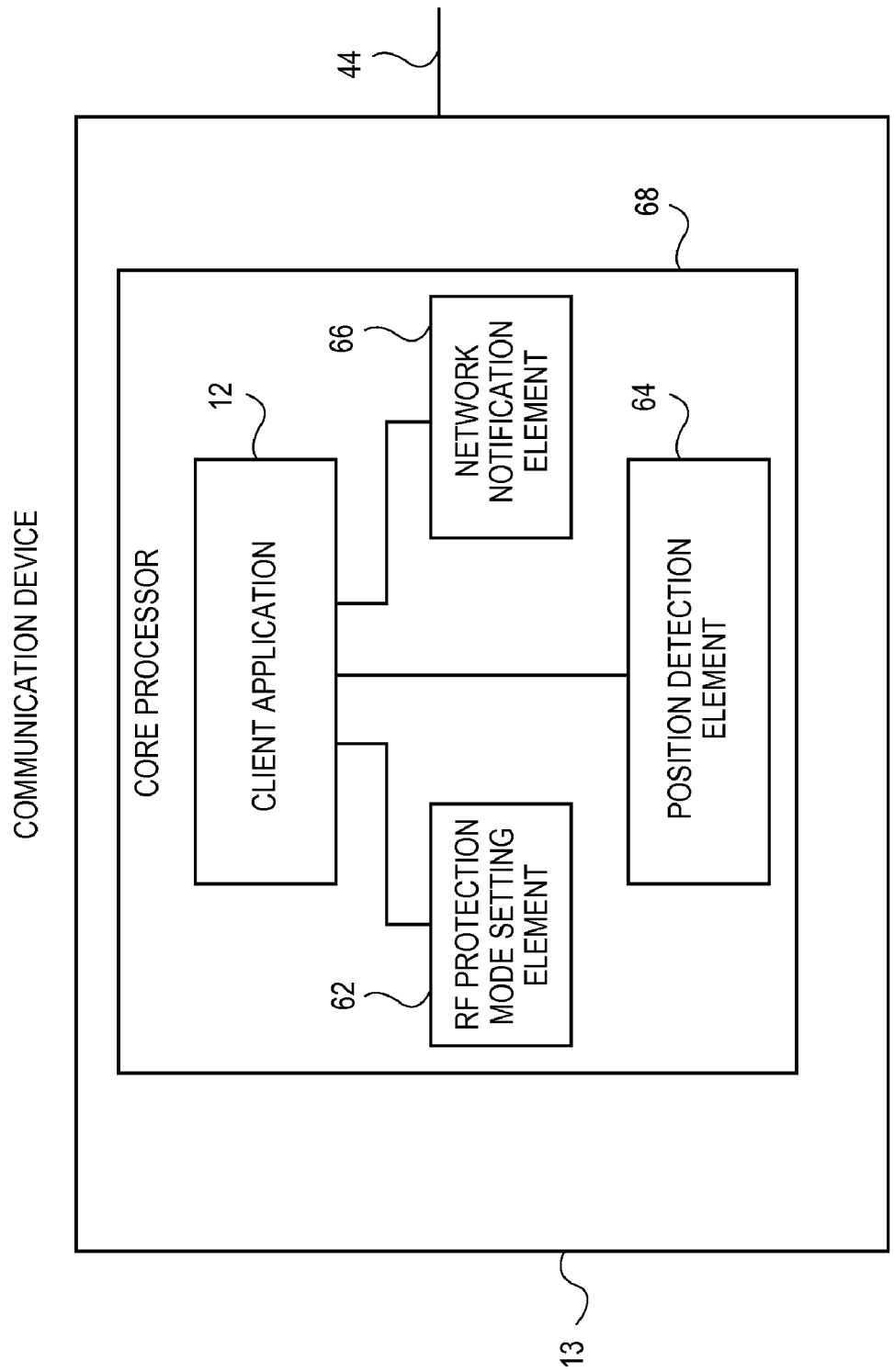
FIG. 6 is a block diagram of a communication device according to the present invention.

Referring to FIG. 6, a block diagram of a communication device 13 according to the present invention is shown. The communication device 13 includes, besides the client application 12, an RF protection mode setting element 62, a position detection element 64, a network notification element 66, and a core processor 68. The client application 12 and elements 62 through 66 are all configured to run on or cooperate with the core processor 68. In various embodiments, the core processor 68 may be either a microprocessor or microcontroller used to execute many of the features and functions on the device 13. Elements 62 through 66 may each be implemented in software, hardware, or a combination of both.

The RF protection mode setting element 62 is responsible for implementing the RF protection mode on device 13 into either the on (set) or off (reset) state. When in the RF protection mode is on, the device 13 initiates the sequence described above with regard to FIGS. 3 and 5 for incoming and outgoing transmissions respectively. When off, the device 13 operates without these RF protection measures, allowing outgoing and incoming transmissions to occur as media is created. As noted above the RF protection mode element 62 may be either manually or automatically set, depending on the behavior or intent of the user 10, the position of the device 13 relative to the user, one or more preset conditions, or any combination thereof.

The position detection element 64 is responsible for determining if the device 13 is a safe distance away from the user 10. In one embodiment, a safe distance is determined by how close or far the device 13 is from the head of the user. In different embodiments, various other criteria may be used, such as the distance from the body of the user, or the placement of the device 13 in a known safe place, such as a docking station or in another room. The position detection element 64 may rely on a number of different embodiments, such as but not limited to, a motion detector to determine when the device 13 is no longer being held by the user 10, a capacitance and/or resistive sensor to determine when the device 13 is no longer in contact with the user 10, an image detector to determine when the device 13 is no longer being held near the head of the user 10, a timer which times the transmission of media a predetermined period of time after the timer has been set, or any combination of the above. The above-listed embodiments for the position detection element 64 should not be construed as limiting. It should be understood that any position detection method or element could be used.

The network notification element 64 is responsible for generating and transmitting the network notification signal and the safe-to-transmit signal from device 13 to the network 40. The network notification signal is generated in response to RF protection mode setting element 62. The safe-to transmit signal is generated in response to the position detection element 64. In both cases, the signals are sent from the device 13 to the servers 42 through the network 44 connecting the device 13 to the network 40.

In the above description, the device 13 was described as a mobile phone. It should be understood that the RF protection feature, as described herein, could be used with any wireless communication device, including but not limited to a wireless phone, a cellular phone, a mobile phone, a satellite phone, a computer, a radio, a tactical radio, or a satellite radio.

Although many of the components and processes are described above in the singular for convenience, it will be appreciated by one of skill in the art that multiple components and repeated processes can also be used to practice the techniques of the system and method described herein. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the invention may be employed with a variety of components and should not be restricted to the ones mentioned above. It is therefore intended that the invention be interpreted to include all variations and equivalents that fall within the true spirit and scope of the invention.

What is claimed is:

1. A method comprising:
   receiving a notification on a network to implement an RF energy protection mode for a wireless communication device wirelessly connected to the network, the notification generated at the wireless communication device and transmitted to the network in response to:
   (i) an explicit command entered into the wireless communication device by the user; or
   (ii) the user's behavior when using the wireless communication device in an unsafe position relative to the user;
   storing media intended for the wireless communication device on the network while the energy protection mode is implemented;
   receiving a second notification on the network when the wireless communication device is positioned a safe distance away from the user of the wireless communication device;
   transmitting the media stored on the network while the RF protection mode was implemented to the wireless communication device after receiving the second notification when the wireless communication device is positioned the safe distance away from the user;
   enabling the storage of the transmitted media on the wireless communication device when the media is transmitted from the network to the wireless communication device; and
   enabling the user of the wireless communication device to render the media after transmission by accessing the media out of storage on the wireless communication device.

2. The method of claim 1, wherein storing the media intended for the wireless communication device on the network further comprises storing the media on a server located on the network.

3. The method of claim 2, wherein storing the media on the server located on the network further comprising storing the media on the server in a time-indexed format.

4. The method of claim 1, wherein the second notification notifying the network when the wireless communication device is positioned the safe distance away from the user further comprises receiving a safe-to-transmit signal from the wireless communication device.

5. The method of claim 4, wherein the safe-to-transmit signal is generated at the wireless communication device in accordance with one of the following:
   (i) a motion detector embedded in the wireless communication device determining when the wireless communication device is no longer being held by the user;
   (ii) a sensor embedded in the wireless communication device determining when the wireless communication device is no longer in contact with the user;
   (iii) an image detector embedded in the wireless communication device determining when the wireless communication device is no longer being held near the head of the user; or
   (iv) generating the safe-to-transmit signal in response to instructions entered into the wireless communication device by the user.

6. The method of claim 1, further comprising:
   receiving a third notification at the network to not implement the RF energy protection mode for the wireless communication device; and
   forwarding media intended for the wireless communication device from a sender as the media is received on the network when the RF energy protection mode is not implemented.

7. The method of claim 1, wherein the wireless communication device is one of the following:
   (i) a wireless phone;
   (ii) a cellular phone;
   (iii) a mobile phone;
   (iv) a satellite phone;
   (v) a computer;
   (vi) a radio;
   (vii) a tactical radio;
   (viii) a satellite radio; or
   (ix) a tactical radio.

8. A node on a network, the node configured to:
   receive a first notification at the node to implement an RF energy protection mode for a wireless communication device wirelessly connected to the network, the first notification received from the wireless communication device either:

(i) in response to an explicit command entered by the user of the wireless communication device;
(ii) automatically when the wireless communication device is placed in an unsafe position relative to the user;

storing media on the node received over the network and intended for the wireless communication device while the RF energy protection mode is implemented;

receiving a second notification at the node when the wireless communication device is positioned a safe distance away from the user of the wireless communication device;

transmitting the media stored at the node, while the RF energy protection mode was implemented, to the wireless communication device in response to the second notification, the transmission enabling:
(iii) the wireless communication device to locally store the transmitted media as the media is received and;
(iv) the user of the wireless communication device to render the media out of local storage on the wireless communication device.

9. The node of claim 8, wherein the automatic receipt of the first notification is generated by the communication device automatically based on the placement of the communication device relative to the user's head.

10. The node of claim 8, wherein the received second notification is a safe-to-transmit signal received from the wireless communication device.

11. The node of claim 10, wherein the safe-to-transmit signal is generated by one of the following:
(i) a motion detector embedded in the wireless communication device that determines when the wireless communication device is no longer being held by the user;
(ii) a sensor embedded in the wireless communication device that determines when the wireless communication device is no longer in contact with the user;
(iii) an image detector embedded in the wireless communication device that determines when the wireless communication device is no longer being held near the head of the user; or
(iv) in response to instructions entered into the wireless communication device by the user.

12. A method performed on a network, the method comprising:

receiving a first notification at a node on the network to implement an RF energy protection mode for a wireless communication device wirelessly connected to the network, the first notification received from the wireless communication device either:
(i) in response to an explicit command entered by the user of the wireless communication device; or
(ii) automatically when the wireless communication device is placed in an unsafe position relative to the user;

storing media on the node received over the network and intended for the wireless communication device while the RF energy protection mode is implemented;

receiving a second notification at the node when the wireless communication device is positioned a safe distance away from the user of the wireless communication device;

transmitting the media stored at the node, while the RF energy protection mode was implemented, to the wireless communication device in response to the second notification the transmission enabling:
(iii) the wireless communication device to locally store the transmitted media as the media is received and;
(iv) the user of the wireless communication device to render the media out of local storage on the wireless communication device.

13. The method of claim 12, wherein the automatic receipt of the first notification is generated by the communication device automatically based on the placement of the communication device relative to the user's head.

14. The method of claim 12, wherein the received second notification is a safe-to-transmit signal received from the wireless communication device.

15. The method of claim 14, wherein the safe-to-transmit signal is generated by one of the following:
(i) a motion detector embedded in the wireless communication device that determines when the wireless communication device is no longer being held by the user;
(ii) a sensor embedded in the wireless communication device that determines when the wireless communication device is no longer in contact with the user;
(iii) an image detector embedded in the wireless communication device that determines when the wireless communication device is no longer being held near the head of the user; or
(iv) in response to instructions entered into the wireless communication device by the user.

16. Computer code embedded in a non-transitory computer readable medium and configured to be executed on a wireless communication device connected to a wireless network, the code configured to:

generate an RF protection mode signal that notifies the network not to transmit media intended for the wireless communication device because the wireless communication device is placed in an unsafe position relative to a user of the communication device, the code generating the RF protection mode signal either:
(i) in response to an explicit command entered by the user of the wireless communication device; or
(ii) automatically when the wireless communication device is in an unsafe position relative to the user;

generate a safe-to-transmit signal that notifies the network that it is safe to transmit the media intended for the wireless communication device and stored on the network while RF protection mode was implemented;

store the transmitted media received from the network in response to the safe-to-transmit signal; and enabling the user of the communication device to render the media out of storage.

17. The code of claim 16, wherein the code is further configured to automatically generate the RF protection mode signal based on the placement of the communication device relative to the user's head.

18. The code of claim 16, wherein the code is further configured to generate the safe-to-transmit signal in response to a motion detector embedded in the wireless communication device that determines when the wireless communication device is no longer being held by the user.

19. The code of claim 16, wherein the code is further configured to generate the safe-to-transmit signal in response to a sensor embedded in the wireless communication device that determines when the wireless communication device is no longer in contact with the user.

20. The code of claim 16, wherein the code is further configured to generate the safe-to-transmit signal in response to an image detector embedded in the wireless communication device that determines when the wireless communication device is no longer being held near the head of the user.

21. The code of claim 16, wherein the code is further configured to generate the safe-to-transmit signal in response to in response to instructions entered into the wireless communication device by the user.

* * * * *